US012668309B2

(12) United States Patent
Maeda

(10) Patent No.: US 12,668,309 B2
(45) Date of Patent: Jun. 30, 2026

(54) ROCKER STRUCTURE

(71) Applicant: TOYOTA JIDOSHA KABUSHIKI KAISHA, Toyota (JP)

(72) Inventor: Kazuhisa Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 18/530,220

(22) Filed: Dec. 6, 2023

(65) Prior Publication Data

US 2024/0253705 A1 Aug. 1, 2024

(30) Foreign Application Priority Data

Jan. 31, 2023 (JP) ................................. 2023-013600

(51) Int. Cl.
B62D 25/02 (2006.01)
B62D 21/12 (2006.01)
B62D 27/06 (2006.01)

(52) U.S. Cl.
CPC ........... B62D 25/025 (2013.01); B62D 21/12 (2013.01); B62D 27/065 (2013.01)

(58) Field of Classification Search
CPC .... B62D 25/025; B62D 21/12; B62D 63/025; B62D 27/065; B62D 27/023; B62D 27/04
USPC ........................................................ 296/209
See application file for complete search history.

(56) References Cited

U.S. PATENT DOCUMENTS 4,881,756 A * 11/1989 Kumasaka ............. B62D 65/04
296/193.03

5,482,323 A * 1/1996 Hicks ..................... B62D 21/14
29/401.1
7,722,059 B1 * 5/2010 Marino .................... B60G 1/04
248/297.21
8,424,912 B2 * 4/2013 Favaretto ............. B62D 23/005
296/205
8,857,853 B2 * 10/2014 Lin ........................ B62D 21/12
280/124.109
9,228,628 B2 * 1/2016 Alavandi ................ B60R 19/34
(Continued)

FOREIGN PATENT DOCUMENTS

JP S51-109518 U 9/1976
JP 2009-113766 A 5/2009
KR 102616433 B1 * 12/2023 ............. B62D 21/14

*Primary Examiner* — Jason S Morrow
(74) *Attorney, Agent, or Firm* — SOLARIS Intellectual Property Group. PLLC

(57) ABSTRACT

A rocker structure includes: a pair of front-side members respectively provided at each side, in a vehicle width direction, of a vehicle lower portion at a vehicle front side, and each front-side member extending in a vehicle front-rear direction and forming a closed cross-sectional structure; a pair of rear-side members, a front end portion of each rear-side member being inserted into a respective one of the front-side members, and each rear-side member extending in the vehicle front-rear direction and forming a closed cross-sectional structure; and fasteners that mechanically fasten together respective ones of the front-side members with respective ones of the rear-side members in at least two states, the at least two states including a first state and a second state, in the first state, an insertion amount of each rear-side member into the respective one of the front-side members is larger than an insertion amount in the second state.

4 Claims, 7 Drawing Sheets

(56) References Cited

U.S. PATENT DOCUMENTS

| | | | | |
|---|---|---|---|---|
| 11,214,311 | B2 * | 1/2022 | Maeda | B62D 27/02 |
| 11,654,975 | B2 * | 5/2023 | Spehar | B62D 27/023 |
| | | | | 296/204 |
| 11,745,798 | B2 * | 9/2023 | Kwon | B60L 50/66 |
| | | | | 180/68.5 |
| 12,221,159 | B2 * | 2/2025 | Cai | B60K 1/04 |
| 12,365,396 | B1 * | 7/2025 | Spehar | B62D 27/02 |
| 2007/0052261 | A1 * | 3/2007 | Andre | B62D 65/04 |
| | | | | 296/193.04 |
| 2007/0176406 | A1 * | 8/2007 | Ruehl | B62D 21/02 |
| | | | | 280/785 |
| 2009/0236877 | A1 * | 9/2009 | Peschansky | B62D 63/025 |
| | | | | 296/203.01 |
| 2014/0319874 | A1 * | 10/2014 | Matsuda | B62D 21/157 |
| | | | | 296/187.12 |
| 2019/0152548 | A1 * | 5/2019 | Shimizu | B62D 21/152 |
| 2022/0135133 | A1 * | 5/2022 | Cai | B60K 1/04 |
| | | | | 296/26.01 |
| 2024/0253709 | A1 * | 8/2024 | Maeda | B62D 24/00 |
| 2025/0242869 | A1 * | 7/2025 | Motoya | B62D 25/025 |
| 2025/0303991 | A1 * | 10/2025 | Saeki | B62D 25/08 |
| 2025/0360966 | A1 * | 11/2025 | Kamemoto | B60K 1/04 |

* cited by examiner

ROCKER STRUCTURE

CROSS-REFERENCE TO RELATED APPLICATION

This application claims priority under 35 USC 119 from Japanese Patent Application No. 2023-13600, filed Jan. 31, 2023, the disclosure of which is incorporated by reference herein in its entirety.

BACKGROUND

Technical Field

The present disclosure relates to a rocker structure.

Related Art

Japanese Patent Application Laid-Open (JP-A) No. 2009-113766 discloses a rocker structure configured by welding together flanges of a rocker inner member having a hat-shaped cross section and a rocker outer member having a hat-shaped cross section.

SUMMARY

Incidentally, in order to accommodate shell bodies of different sizes, a structure that enables the length of a rocker in a vehicle front-rear direction to be adjusted is required.

The present disclosure provides a rocker structure that is capable of adjusting a length in a vehicle front-rear direction.

A rocker structure of a first aspect of the present disclosure includes: a pair of front-side members, the front-side members respectively provided at each side, in a vehicle width direction, of a vehicle lower portion at a vehicle front side, and each front-side member extending in a vehicle front-rear direction and forming a closed cross-sectional structure; a pair of rear-side members, a front end portion of each rear-side member being inserted into a respective one of the front-side members, and each rear-side member extending in the vehicle front-rear direction and forming a closed cross-sectional structure; and fasteners that mechanically fasten together respective ones of the front-side members with respective ones of the rear-side members in at least two states, the at least two states including a first state and a second state, in the first state, an insertion amount of each rear-side member into the respective one of the front-side members is larger than an insertion amount in the second state.

In the rocker structure of the first aspect, respective front-side members are provided at each side, in the vehicle width direction, of a vehicle lower portion at the vehicle front side, and each front-side member extends in the vehicle front-rear direction and is configured with a closed cross-section. Further, a front end portion of each rear-side member is inserted into a respective one of the front-side members. Each rear-side member extends in the vehicle front-rear direction and is configured with a closed cross-section.

Moreover, respective ones of the front-side members and the rear-side members are fastened together by the fasteners in at least two states. The at least two states includes a first state and a second state, in the first state, the insertion amount of each rear-side member into a respective one of the front-side members is larger than the insertion amount in the second state. As a result, if respective ones of the front-side members and the rear-side members are mechanically fastened together by the fasteners in the first state, the rocker structure can correspond to a vehicle having a shell body with a relatively short wheel base length. In addition, if respective ones of the front-side members and the rear-side members are mechanically fastened together by the fasteners in the second state, the rocker structure can correspond to a vehicle having a shell body with a relatively long wheel base length.

A rocker structure of a second aspect of the present disclosure is the rocker structure of the first aspect, wherein: plural first insertion holes are formed at each front-side member with a spacing between the first insertion holes in the vehicle front-rear direction; and plural second insertion holes are formed at each rear-side member at positions corresponding to each of the plural first insertions holes, in the first state and the second state.

In the rocker structure of the second aspect, each first insertion hole and each second insertion hole are formed at positions corresponding to each other in the first state and the second state. As a result, in either the first state or the second state, each first insertion hole of a respective one of the front-side members and each second insertion hole of a respective one of the rear-side members communicate with each other, such that respective ones of the front-side members and the rear-side members can be easily fastened together by inserting a fastener through each first insertion hole and second insertion hole.

A rocker structure of a third aspect of the present disclosure is the rocker structure of the second aspect, wherein: each front-side member and each rear-side member includes an upper wall, a lower wall, and side walls that couple the upper wall and the lower wall together, as viewed from the vehicle front-rear direction; and the first insertion holes and second insertion holes are formed at at least two wall surfaces among corresponding upper walls, corresponding lower walls and corresponding side walls of respective ones of the front-side members and the rear-side members.

In the rocker structure of the third aspect, each front-side member has first insertion holes formed at at least two wall surfaces from among the upper wall, the lower wall, and the side walls, and each rear-side member has second insertion holes formed at at least two wall surfaces from among the upper wall, the lower wall, and the side walls, similarly to the front-side member. As a result, since respective ones of the front-side members and the rear-side members can be fastened together at two or more wall surfaces of the four wall surfaces, a fastening state can be satisfactorily maintained.

A rocker structure of a fourth aspect of the present disclosure is the rocker structure of the first aspect, wherein: respective patch members are provided at a front portion of each rear-side member in the second state; and respective ones of the front-side members and the patch members are mechanically fastened together by the fasteners.

In the rocker structure of the fourth aspect, in the second state, by mechanically fastening together respective ones of the patch members and the front-side members with the fasteners, each insertion hole of a respective one of the front-side members, through which a fastener is not inserted into a respective one of the rear-side members, can be closed by a fastener, and water can be prevented from entering into the vehicle interior through each insertion hole.

A rocker structure of a fifth aspect of the present disclosure is the rocker structure of the first aspect, wherein each fastener includes a weld nut that is fixed to an inner surface of the rear-side member, and a bolt that is screwed into the weld nut from an outer side of each front-side member.

In the rocker structure of the fifth aspect, respective ones of the front-side members and the rear-side members can be easily mechanically fastened together simply by screwing and fastening the bolt in the weld nut.

As explained above, the rocker structure according to the present disclosure enables the length in the vehicle front-rear direction of the rocker structure to be adjusted.

DETAILED DESCRIPTION

First Exemplary Embodiment

Explanation follows regarding a rocker structure according to an exemplary embodiment, with reference to the drawings. Note that in each of the drawings, as appropriate, the arrow UP, the arrow FR, and the arrow RH respectively indicate the upper side in a vehicle vertical direction, the front side in a vehicle front-rear direction, and the vehicle right-hand side when facing the direction of travel, in a vehicle 10 to which a rocker structure is applied. Unless specifically stated otherwise, simple reference to the front and rear, up and down, and the left and right directions refers to the front and the rear in the vehicle front-rear direction, up and down in the vehicle vertical direction, and the left and the right in the vehicle width direction.

Figure 1:
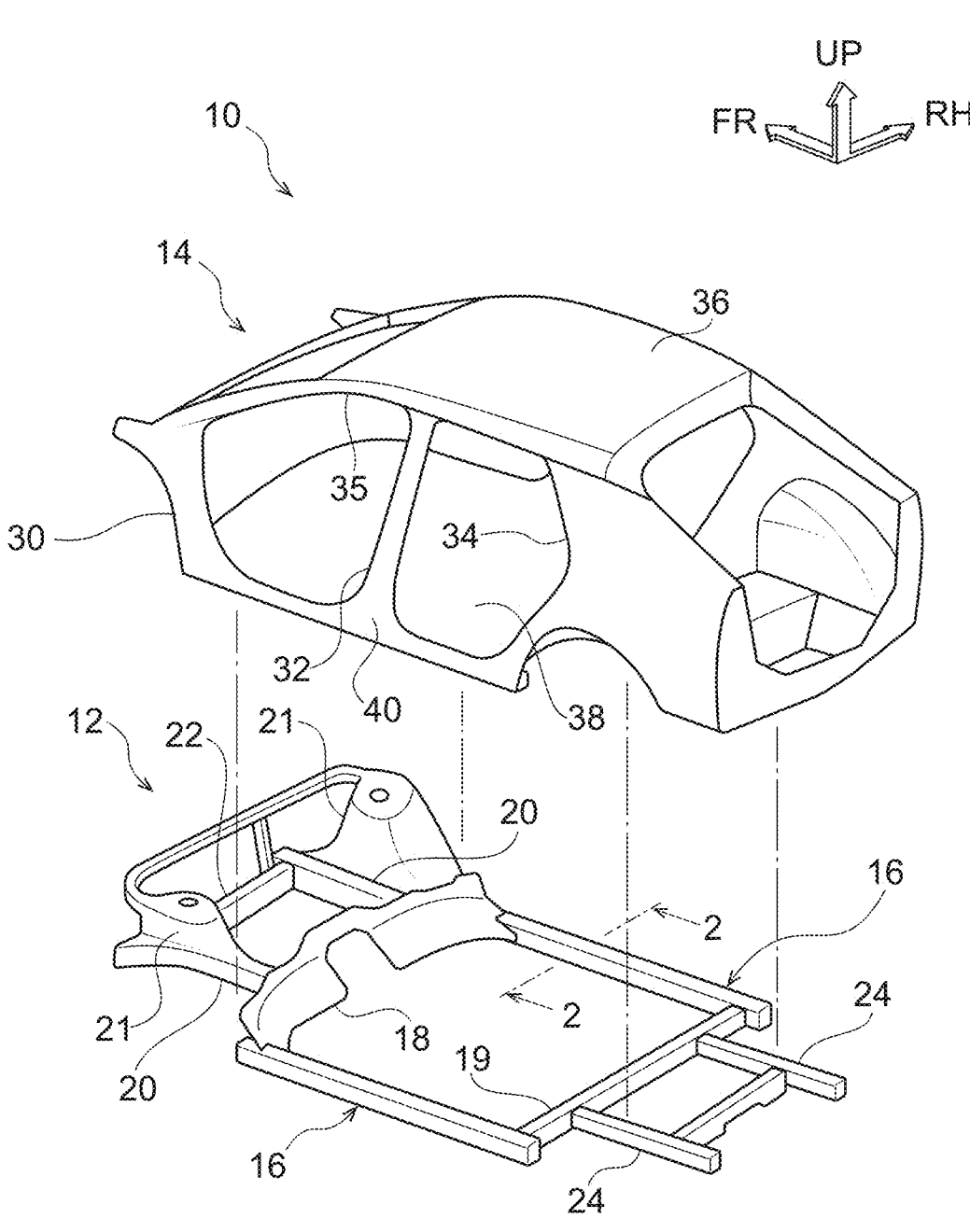
FIG. 1 is an exploded perspective view illustrating the main parts of a vehicle to which a rocker structure according to a first exemplary embodiment is applied.

FIG. 1 is an exploded perspective view illustrating the main parts of the vehicle 10 to which a rocker structure according to an exemplary embodiment is applied. As illustrated in FIG. 1, the vehicle 10 to which the rocker structure is applied mainly includes a lower frame 12 and a shell body 14. The lower frame 12 configures a skeleton of a lower portion of the vehicle 10, and includes rockers 16 extending in the front-rear direction.

A pair of rockers 16 are provided at each side in the vehicle width direction. Each rocker 16 of the pair of rockers 16 is provided at an outer side, in the vehicle width direction, of a vehicle lower portion and extends in the front-rear direction. Further, each of the rockers 16 is formed in a closed cross-sectional shape by extrusion molding or the like. Details of the rockers 16 will be described below.

Respective front end portions of the pair of rockers 16 are coupled in the vehicle width direction by a cross member 18. The cross member 18 extends in the vehicle width direction, and respective rear end portions of each of a pair of front-side members 20 are coupled to positions of the cross member 18 that are offset further toward an inner side from each end portion, in the vehicle width direction, of the cross member 18. Therefore, the cross member 18 couples the front end portions of the left and right pair of rockers 16 and the rear end portions of the left and right pair of front-side members 20, respectively.

The respective front-side members 20 of the pair of front-side members 20 are provided at each side in the vehicle width direction and extend in the front-rear direction. Further, although each of the front-side members 20 is formed in a closed cross-sectional shape by extrusion molding or the like, a closed cross-sectional structure may be employed by overlapping steel plates. Respective front end portions of the pair of front-side members 20 are coupled in the vehicle width direction by a front cross member 22. In addition, a suspension tower 21 is provided at each of the pair of front-side members 20.

Respective rear end portions of the pair of rockers 16 are coupled in the vehicle width direction by a cross member 19, and respective front end portions of a pair of rear-side members 24 are coupled to the cross member 19. The pair of rear-side members 24 is provided in the vehicle width direction, with each rear-side member 24 extending in the vehicle front-rear direction. Further, although each rear-side member 24 is formed in a closed cross-sectional shape by extrusion molding or the like, a closed cross-sectional structure may be employed by overlapping steel plates. Respective rear portions of the pair of rear-side members 24 are coupled in the vehicle width direction by a rear cross member 26.

The shell body 14 configures a vehicle interior (cabin) of the vehicle 10, and mainly includes a front pillar portion 30, a center pillar portion 32, a rear pillar portion 34, a roof side rail 35, a roof panel 36, a floor panel 38, and a side member outer panel 40.

The front pillar portion 30 extends in the vertical direction at a front end of the shell body 14. At further toward the vehicle rear side than the front pillar portion 30, the center pillar portion 32 extends in the vertical direction. At further toward the vehicle rear side than the center pillar portion 32, the rear pillar portion 34 extends in the vertical direction. Further, the front pillar portion 30, the center pillar portion 32, and the rear pillar portion 34 are respectively provided at each side in the vehicle width direction, and each have a closed cross-sectional structure so as to function as a skeleton of the shell body 14.

The roof side rail 35 couples upper ends of the front pillar portion 30, the center pillar portion 32, and the rear pillar portion 34 in the front-rear direction, and respective roof side rails 35 are provided at each side in the vehicle width direction. The roof panel 36 is installed between the left and right roof side rails 35, extends in the vehicle width direction and in the vehicle front-rear direction, and configures a ceiling portion of the vehicle interior.

The floor panel 38 is provided at a lower portion of the shell body 14 and extends in the vehicle width direction and in the vehicle front-rear direction, and configures a floor surface of the vehicle interior. Note that the floor panel 38 includes a center floor panel that is coupled to the respective rockers 16, and a rear floor panel that is coupled to the respective rear-side members 24.

The side member outer panel 40 configures an outer plate of the shell body 14. Specifically, the side member outer panel 40 is provided at an outside surface of the skeleton of the front pillar portion 30, an outside surface of the skeleton of the center pillar portion 32, and an outside surface of the skeleton of the rear pillar portion 34. Further, a lower portion of the side member outer panel 40 couples lower end portions of the front pillar portion 30, the center pillar portion 32, and the rear pillar portion 34 in the vehicle front-rear direction, and is a portion that is fastened to each rocker 16.

A front-side opening portion is formed by the front pillar portion 30, the center pillar portion 32, the roof side rail 35, and the side member outer panel 40, and the front-side opening portion is closed by a front-side door that is not illustrated in the drawings. In addition, a rear-side opening portion is formed by the center pillar portion 32, the rear pillar portion 34, the roof side rail 35, and the side member outer panel 40, and the rear-side opening portion is closed by a rear-side door that is not illustrated in the drawings.

Rockers 16

Figure 2:
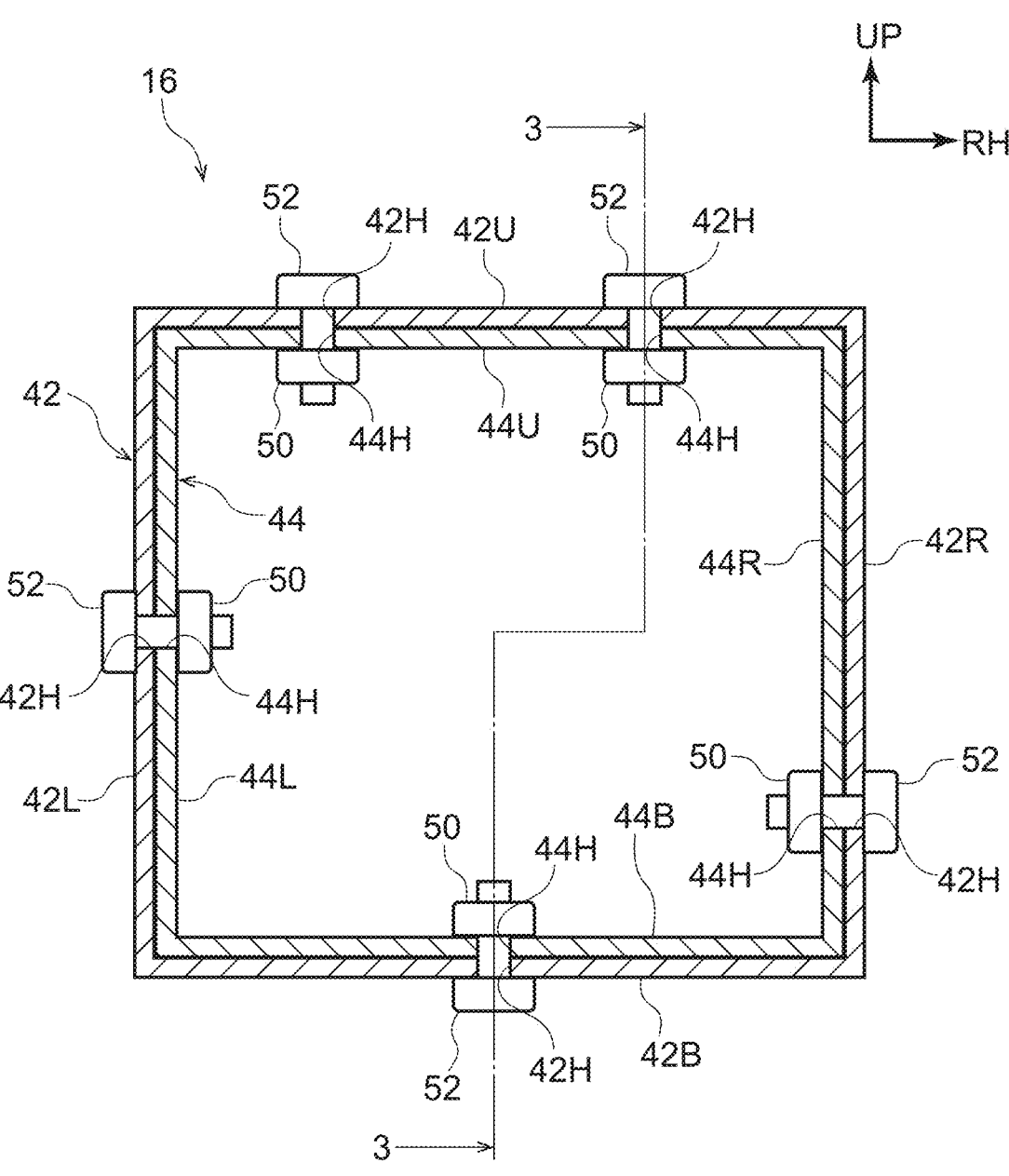
FIG. 2 is an enlarged cross-sectional view illustrating the main parts taken along line 2-2 in FIG. 1.

FIG. 2 is an enlarged cross-sectional view illustrating the main parts taken along line 2-2 in FIG. 1. As illustrated in FIG. 2, each rocker 16 mainly includes a front-side member 42 and a rear-side member 44.

The respective front-side members 42 are provided at each side, in the vehicle width direction, of the vehicle lower portion at the front side, and each front-side member 42 extends in the front-rear direction and forms a closed cross-sectional structure. Specifically, each front-side member 42 includes a front-side upper wall 42U that is positioned at an upper portion, a front-side lower wall 42B that is positioned at a lower portion, a front-side right wall 42R that couples right ends of the front-side upper wall 42U and the front-side lower wall 42B, and a front-side left wall 42L that couples left ends of the front-side upper wall 42U and the front-side lower wall 42B, when viewed from the front-rear direction.

Two first insertion holes 42H are formed at the front-side upper wall 42U at the left and right sides when viewed from the front-rear direction. A first insertion hole 42H is formed at a center portion, in the vehicle width direction, of the front-side lower wall 42B when viewed from the vehicle front-rear direction.

A first insertion hole 42H is formed at a lower portion of the front-side right wall 42R when viewed from the vehicle front-rear direction. A first insertion hole 42H is formed at a center portion, in the vertical direction, of the front-side left wall 42L when viewed from the vehicle front-rear direction. Therefore, the first insertion holes 42H, which are formed at the front-side member 42, are all formed such that an axial direction of respective first insertion holes 42Hs are offset from each other. Further, the plural first insertion holes 42H are formed with a spacing therebetween in the front-rear direction.

A front end portion of each rear-side member 44 is inserted into a respective one of the front-side members 42, and each rear-side member 44 extends in the front-rear direction and has a closed cross-sectional structure. Specifically, each rear-side member 44 includes a rear-side upper wall 44U that is positioned at an upper portion, a rear-side lower wall 44B that is positioned at a lower portion, a rear-side right wall 44R that couples right ends of the rear-side upper wall 44U and the rear-side lower wall 44B, and a rear-side left wall 44L that couples left ends of the rear-side upper wall 44U and the rear-side lower wall 44B, when viewed from the vehicle front-rear direction.

Two second insertion holes 44H are formed at the rear-side upper wall 44U at the left and right sides when viewed in the vehicle front-rear direction, and each of these second insertion holes 44H communicates with a respective one of the first insertion holes 42H of the front-side upper wall

42U. A second insertion hole 44H is formed at a center portion, in the vehicle width direction, of the rear-side lower wall 44B when viewed from the vehicle front-rear direction, and this second insertion hole 44H communicates with the first insertion hole 42H of the front-side lower wall 42B.

A second insertion hole 44H is formed at a lower portion of the rear-side right wall 44R when viewed from the vehicle front-rear direction, and this second insertion hole 44H communicates with the first insertion hole 42H of the front-side right wall 42R. A second insertion hole 44H is formed at a center portion, in the vertical direction, of the rear-side left wall 44L when viewed from the vehicle front-rear direction, and this second insertion hole 44H communicates with the first insertion hole 42H of the front-side left wall 42L.

A weld nut 50, which configures a fastener, is provided at each of the rear-side upper wall 44U, the rear-side lower wall 44B, the rear-side right wall 44R, and the rear-side left wall 44L of the respective rear-side members 44. The weld nut 50 is provided at a position corresponding to each one of the second insertion holes 44H, and respective ones of the front-side members 42 and the rear-side members 44 are fastened together due to bolts 52 being screwed in from an outer side of the front-side member 42 (rocker 16).

Figure 3:
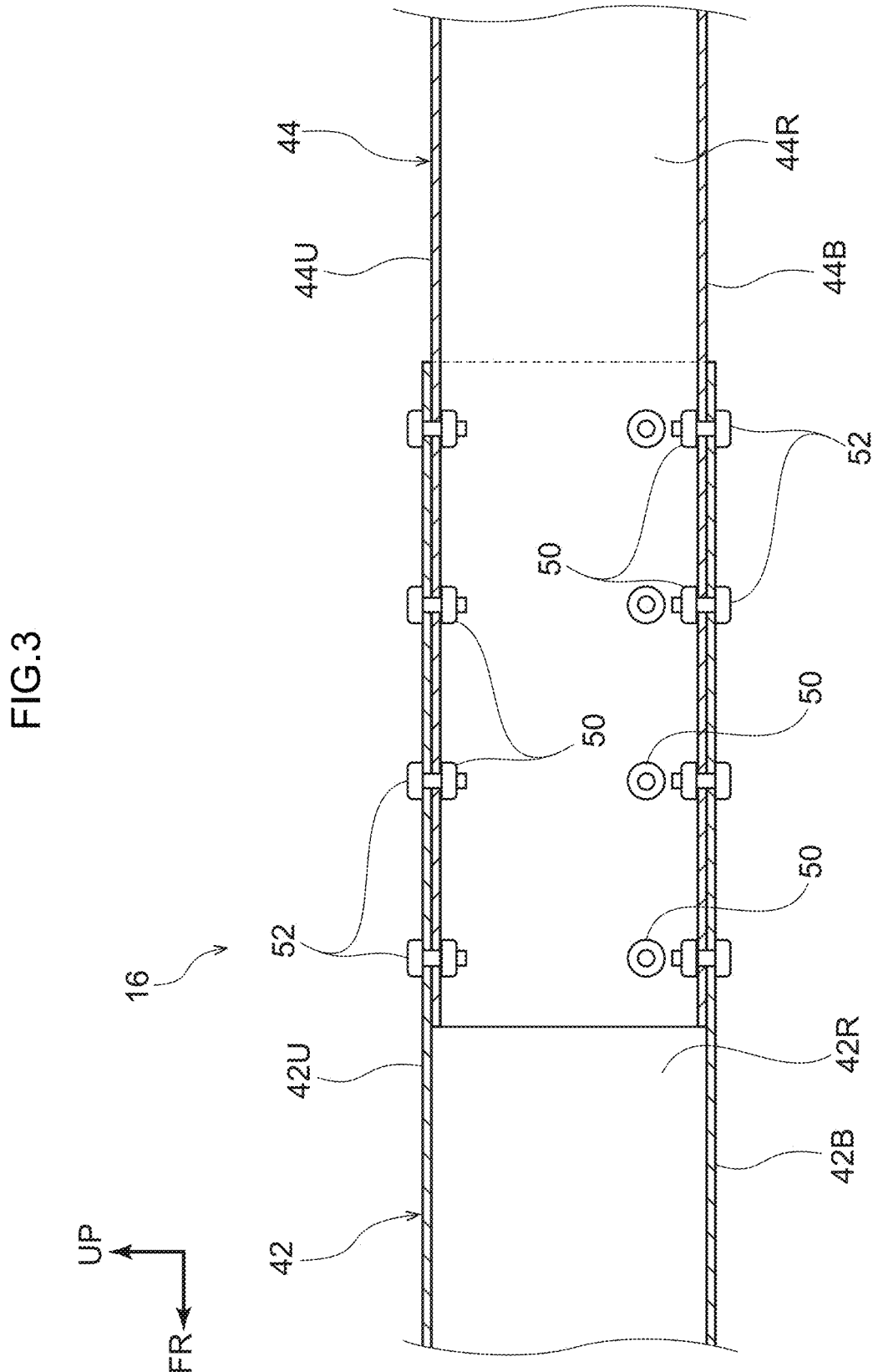
FIG. 3 is an enlarged cross-sectional view illustrating the main parts taken along line 3-3 in FIG. 2, and illustrates a first state.

Note that each rocker 16 of the present exemplary embodiment is configured so as to be capable of shifting to two states, the two states including a first state and a second state. In the first state, the insertion amount of the rear-side member 44 with respect to the front-side member 42 is larger than the insertion amount in the second state. FIG. 3 is an enlarged cross-sectional view illustrating the main parts taken along line 3-3 in FIG. 2, and illustrates the first state. Further, FIG. 4 is an enlarged cross-sectional view illustrating the main parts taken along line 3-3 in FIG. 2, and illustrates the second state.

As illustrated in FIG. 3, in the first state in which the insertion amount of the rear-side member 44 with respect to the front-side member 42 is large, the front-side upper wall 42U and the rear-side upper wall 44U are fastened together at four consecutive positions in the front-rear direction when viewed from the vehicle width direction. Further, the front-side lower wall 42B and the rear-side lower wall 44B are fastened together at four consecutive positions in the front-rear direction when viewed from the vehicle width direction. Similarly to the upper wall and the lower wall, the front-side right wall 42R and the rear-side right wall 44R are fastened together at four consecutive positions in the front-rear direction. Further, although not illustrated in the drawings, similarly to the right wall, the front-side left wall 42L and the rear-side left wall 44L are fastened together at four consecutive positions in the front-rear direction.

Figure 4:
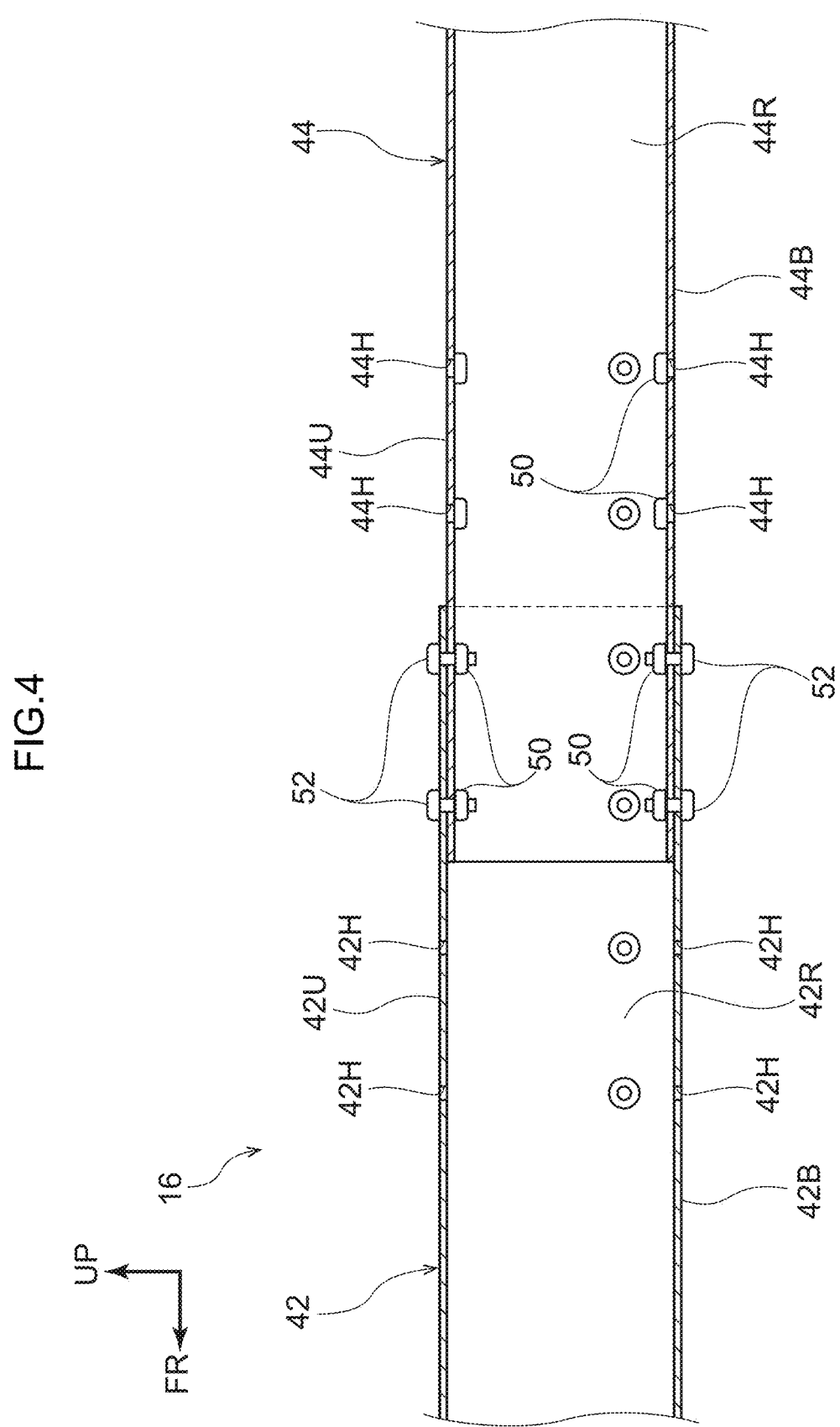
FIG. 4 is an enlarged cross-sectional view illustrating the main parts taken along line 3-3 in FIG. 2, and illustrates a second state.

As illustrated in FIG. 4, in the second state in which the insertion amount of the rear-side member 44 with respect to the front-side member 42 is smaller than the first state, the front-side upper wall 42U and the rear-side upper wall 44U are fastened together at two positions in the front-rear direction when viewed from the vehicle width direction. Further, the front-side lower wall 42B and the rear-side lower wall 44B are fastened together at two positions in the front-rear direction when viewed from the vehicle width direction. Similarly to the upper wall and the lower wall, the front-side right wall 42R and the rear-side right wall 44R are fastened together at two positions in the front-rear direction. Further, although not illustrated in the drawings, similarly to the right wall, the front-side left wall 42L and the rear-side left wall 44L are fastened together at two positions in the front-rear direction.

In this manner, in both the first state and the second state, respective ones of the front-side members 42 and the rear-side members 44 are mechanically fastened together by the bolts 52 and the weld nuts 50, which are fasteners. Further, in both the first state and the second state, a configuration is such that the first insertion holes 42H and the second insertion holes 44H communicate with each other.

Operation

Explanation follows regarding operation of the present exemplary embodiment.

In the rocker structure according to the present exemplary embodiment, as illustrated in FIG. 3, each front-side member 42 extends in the front-rear direction and is configured with a closed cross-section. Further, the front end portion of each rear-side member 44 is inserted into a respective one of the front-side members 42, and each rear-side member 44 extends in the vehicle front-rear direction and is configured with a closed cross-section. In addition, in at least two states, the two states including the first state in which the insertion amount of each rear-side member 44 into a respective one of the front-side members 42 is large, and the second state in which the insertion amount is smaller than the first stage, respective ones of the front-side members 42 and the rear-side members 44 are mechanically fastened together by the weld nuts 50 and the bolts 52, which are fasteners.

Therefore, if the respective ones of front-side members 42 and the rear-side members 44 are mechanically fastened together in the first state by the fasteners, a vehicle having a shell body 14 with a relatively short wheel base length can be accommodated. Further, if the respective ones of the front-side members 42 and the rear-side members 44 are mechanically fastened together in the second state by the fasteners, a vehicle having a shell body 14 with a relatively long wheel base length can be accommodated. A configuration that enables the length of the rockers 16 in the front-rear direction to be adjusted in this manner enables different shell bodies 14 to be accommodated.

Further, in the present exemplary embodiment, the first insertion holes 42H and the second insertion holes 44H are formed at corresponding positions in the first state and the second state. Therefore, in either the first state or the second state, the first insertion holes 42H of the front-side member 42 and the second insertion holes 44H of the rear-side member 44 communicate with each other, such that the respective ones of the front-side members 42 and the rear-side members 44 can be easily fastened together by inserting the bolts 52 through the first insertion holes 42H and the second insertion holes 44H.

Furthermore, each front-side member 42 is formed with the first insertion holes 42H at at least two wall surfaces from among the front-side upper wall 42U, the front-side lower wall 42B, the front-side right wall 42R, and the front-side left wall 42L. Each rear-side member is formed with the second insertion holes 44H at at least two wall surfaces from among the rear-side upper wall 44U, the rear-side lower wall 44B, the rear-side right wall 44R, and the rear-side left wall 44L. This enables the respective ones of the front-side members 42 and the rear-side members 44 to be fastened together at two or more wall surfaces of the four wall surfaces, thereby enabling the fastening state to be satisfactorily maintained.

Note that in the above-described exemplary embodiment, as illustrated in FIG. 4, in the second state, the bolts 52 are not inserted into two first insertion holes 42H at front side of the front-side member 42 or into two second insertion hole 44H at rear side of the rear-side member 44. Therefore, the first insertion holes 42H and the second insertion holes 44H may be closed with a sealing material or the like in order to prevent water from entering into the vehicle interior. Further, similarly to a modified example illustrated in FIG. 5, a patch member 60 may be used.

Modified Example

Figure 5:
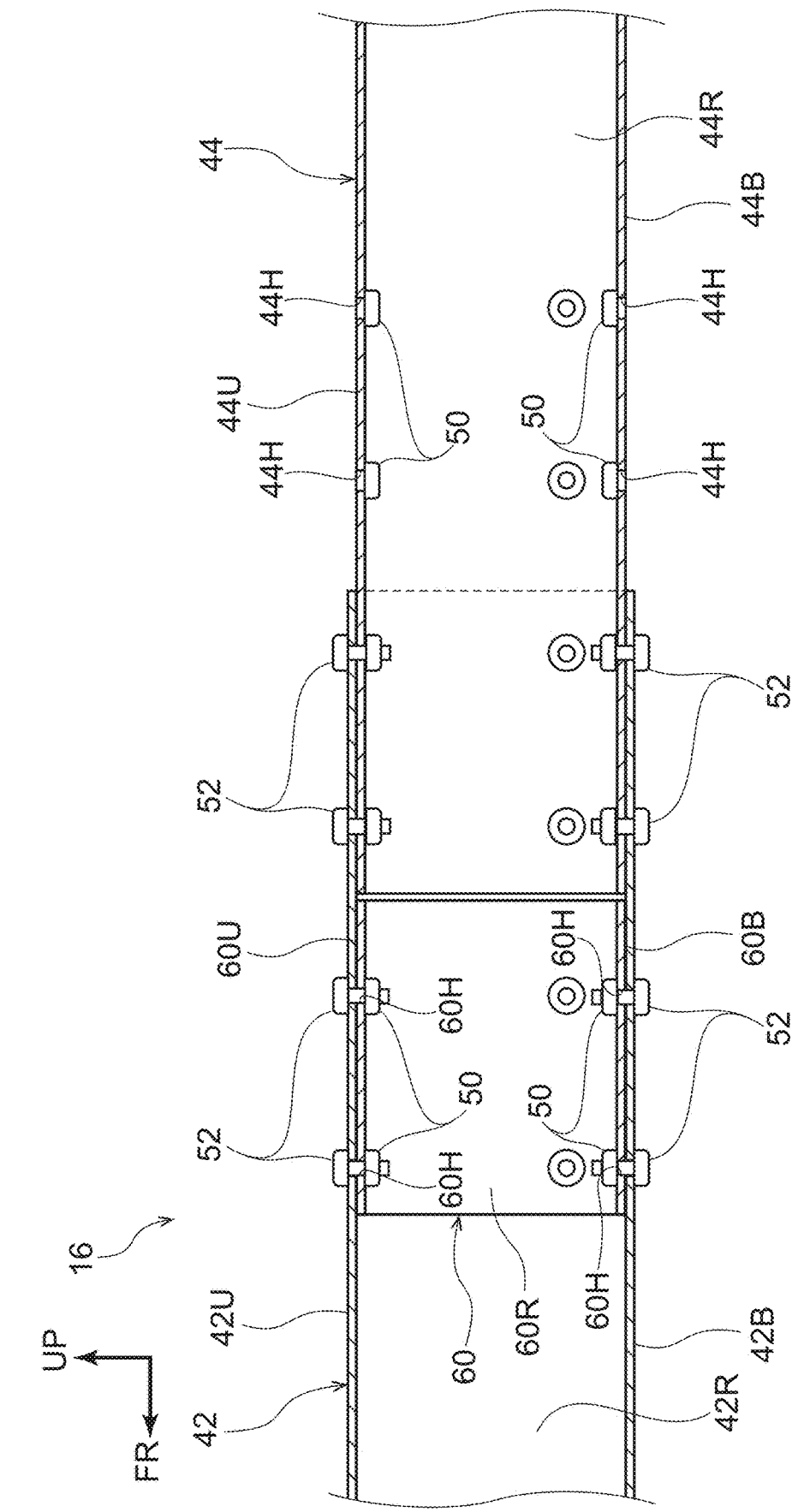
FIG. 5 is a view corresponding to FIG. 4, and illustrates the main parts of a rocker structure according to a modified example.

FIG. 5 is a view corresponding to FIG. 4, and illustrates the main parts of a rocker structure according to a modified example. As illustrated in FIG. 5, in the second state, a patch member 60 is disposed inside each front-side member 42.

Similarly to the front-side member 42 and the rear-side member 44, the patch member 60 is formed in a closed cross-sectional shape, and includes an upper wall 60U, a lower wall 60B, a right wall 60R, and a left wall (not illustrated). A length of the patch member 60 in the front-rear direction is a length including two fastening portions, and a height of the patch member 60 in the vertical direction is approximately the same height as the rear-side members 44.

Plural insertion holes 60H are formed with spacings therebetween in the front-rear direction at the upper wall 60U of the patch member 60. Further, similarly to the upper wall 60U of the patch member 60, plural insertion holes 60H are formed with spacings therebetween in the front-rear direction at the lower wall 60B of the patch member 60. In addition, a weld nut 50 is fixed at a position corresponding to each one of the insertion holes 60H at an inner wall of the patch member 60.

The insertion holes 60H formed at the patch member 60 correspond to the plural first insertion holes 42H formed at the front-side member 42, and the insertion holes 60H of the patch member 60 communicate with the first insertion holes 42H of the front-side member 42. Further, the front-side member 42 and the patch member 60 are mechanically fastened together by the weld nuts 50 and the bolts 52, serving as fasteners.

In this manner, in the present modified example, by mechanically fastening the patch member 60 and the front-side member 42 together with the fasteners, the first insertion holes 42H, through which the fasteners are inserted, can be closed, and water can be prevented from entering into the vehicle interior. Note that the bolts 52 may also be inserted through the second insertion holes 44H.

Second Exemplary Embodiment

Figure 6:
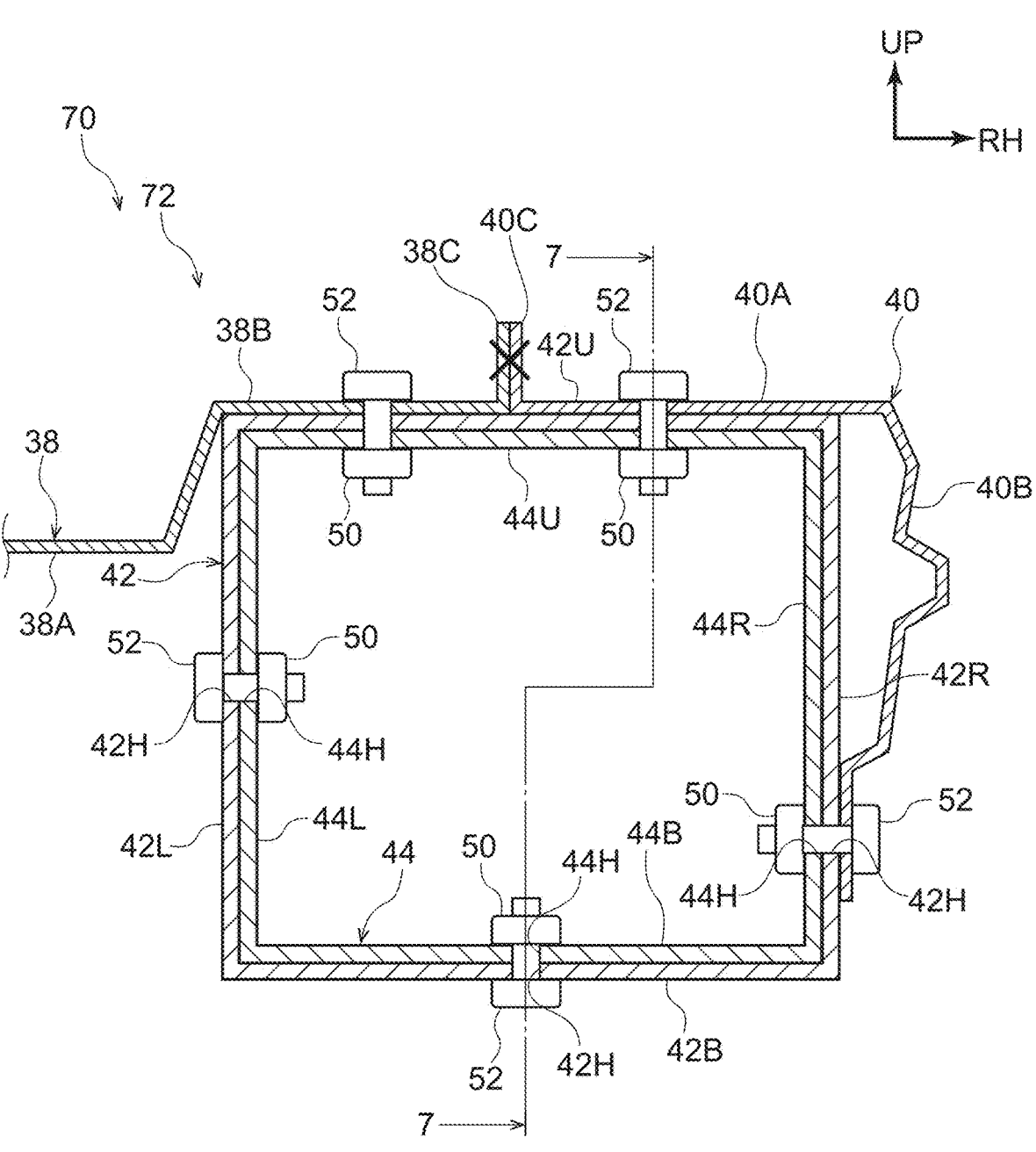
FIG. 6 is an enlarged cross-sectional view illustrating the main parts corresponding to FIG. 2, and illustrates the main parts of a rocker structure according to a second exemplary embodiment.
Figure 7:
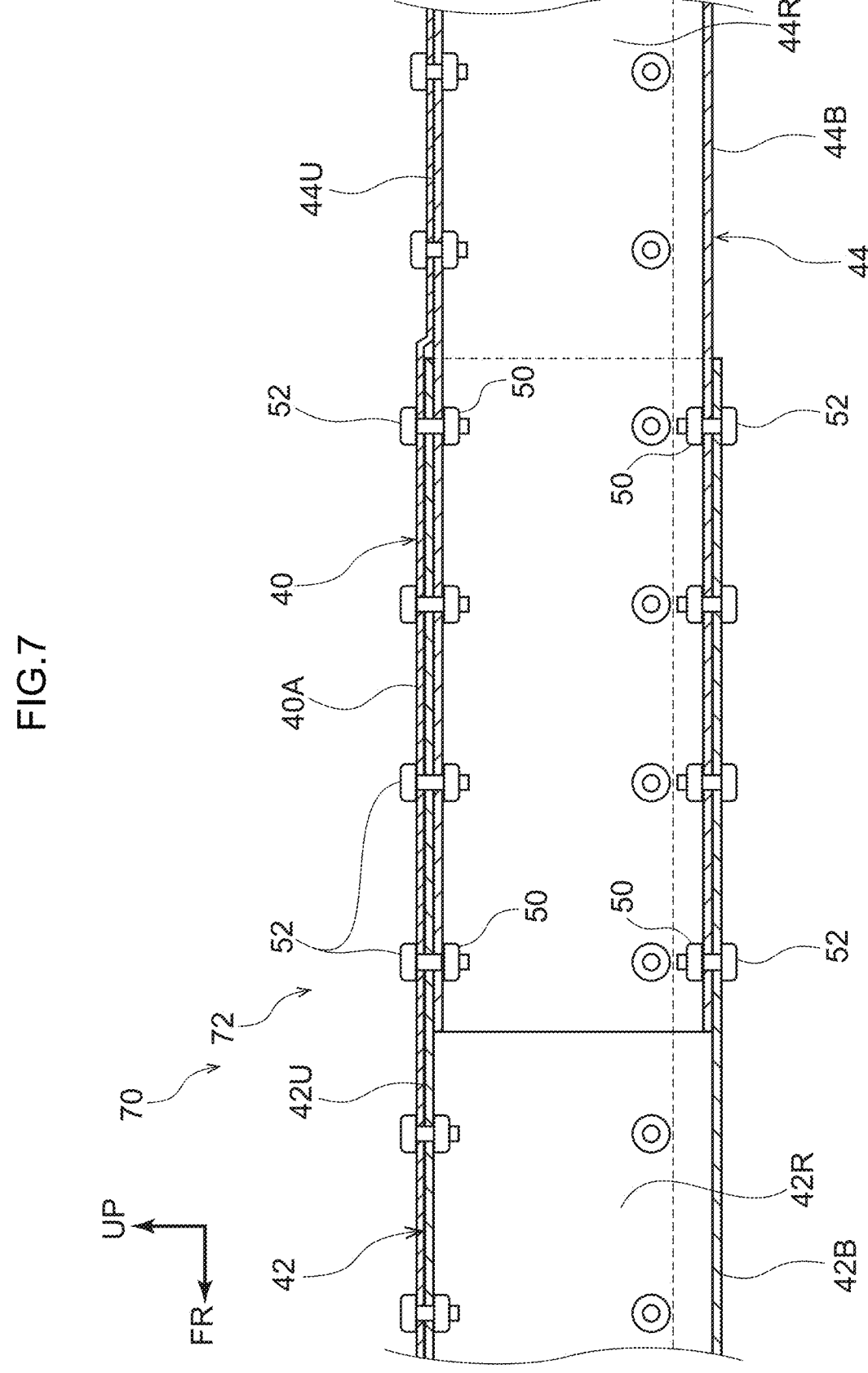
FIG. 7 is an enlarged cross-sectional view illustrating the main parts taken along line 7-7 in FIG. 6.

Explanation follows regarding a rocker structure according to a second exemplary embodiment, with reference to FIG. 6 and FIG. 7. Note that constituent elements that are the same as the constituent elements in the first exemplary embodiment are allocated the same reference numerals, and explanation thereof is omitted as appropriate.

FIG. 6 is an enlarged cross-sectional view illustrating the main parts corresponding to FIG. 2, and illustrates the main parts of a rocker structure according to the second exemplary embodiment. Further, FIG. 7 is an enlarged cross-sectional view illustrating the main parts taken along line 7-7 in FIG. 6.

As illustrated in FIG. 6, each rocker 72 configuring the vehicle 70 of the present exemplary embodiment includes the front-side member 42 and the rear-side member 44. Further, the floor panel 38 is joined to the rockers 72. The floor panel 38 includes a base portion 38A and an inner upper wall covering portion 38B. The base portion 38A extends in the vehicle width direction and in the front-rear direction, with the vertical direction serving as a plate thickness direction of the base portion 38A, and the base portion 38A configures the floor surface of the vehicle interior. Further, the base portion 38A is positioned lower than the upper end of the rockers 72.

An outer end portion, in the vehicle width direction, of the base portion 38A extends out toward the vehicle upper side around the front-side left wall 42L of the rocker 72, and is coupled to the inner upper wall covering portion 38B. The inner upper wall covering portion 38B extends outwardly, in the vehicle width direction, from the base portion 38A, and is fastened to the rocker 72 in a state overlapping with upper walls (the front-side upper wall 42U and the rear-side upper wall 44U) of the rocker 72.

Specifically, the inner upper wall covering portion 38B extends to a center portion, in the vehicle width direction, of the front-side upper wall 42U, and an insertion hole is formed at a position corresponding to each weld nut 50. The bolt 52 is inserted from above the inner upper wall covering portion 38B and is screwed into each weld nut 50, such that the inner upper wall covering portion 38B is mechanically fastened together with the front-side member 42 and the rear-side member 44.

A flange portion 38C extends upwardly from an outer end portion, in the vehicle width direction, of the inner upper wall covering portion 38B, and the flange portion 38C overlaps with a flange portion 40C of the side member outer panel 40.

The side member outer panel 40 includes an outer upper wall covering portion 40A that is fastened to the rocker 72 in a state overlapping with the upper walls (the front-side upper wall 42U and the rear-side upper wall 44U) of the rocker 72. An inner end portion, in the vehicle width direction, of the outer upper wall covering portion 40A abuts the inner upper wall covering portion 38B of the floor panel 38, and an outer end portion, in the vehicle width direction, of the outer upper wall covering portion 40A extends further outwardly than the rocker 72.

An insertion hole is formed at the outer upper wall covering portion 40A, and the insertion hole communicates with the first insertion hole 42H of the front-side member 42 and the second insertion hole 44H of the rear-side member 44. Further, the bolt 52 is inserted from above the outer upper wall covering portion 40A and is screwed into the weld nut 50, such that the outer upper wall covering portion 40A is mechanically fastened together with the front-side member 42 and the rear-side member 44.

The flange portion 40C extends upwardly from an inner end portion, in the vehicle width direction, of the outer upper wall covering portion 40A, and the flange portion 38C of the floor panel 38 and the flange portion 40C of the side member outer panel 40 are joined together by spot welding or the like in a state in which they overlap with each other.

Further, the side member outer panel 40 includes an outer wall covering portion 40B that extends downward along the front-side right wall 42R and the rear-side right wall 44R from the outer upper wall covering portion 40A. An insertion hole is formed at the outer wall covering portion 40B, and the insertion hole communicates with the first insertion hole 42H of the front-side member 42 and the second insertion hole 44H of the rear-side member 44. The bolt 52 is inserted from the outside of the outer wall covering portion 40B and is screwed into the weld nut 50, such that the outer wall covering portion 40B is mechanically fastened together with the front-side member 42 and the rear-side member 44.

As illustrated in FIG. 7, the side member outer panel 40 extends along the rocker 72 in the front-rear direction, and is mechanically fastened by the bolts 52 and the weld nuts 50 in a state overlapping with the front-side upper wall 42U of the front-side member 42 and the rear-side upper wall 44U of the rear-side member 44. Further, a step portion corresponding to a step between the front-side member 42 and the rear-side member 44 is formed at the outer upper wall covering portion 40A of the side member outer panel 40.

Operation

Explanation follows regarding operation of the present exemplary embodiment.

In the rocker structure according to the present exemplary embodiment, respective ones of the front-side members 42 and the rear-side members 44 are mechanically fastened together using the bolts 52 and the weld nuts 50 for fastening the floor panel 38 and the side member outer panel 40 to the rockers 72. This eliminates the need for a dedicated fastener for fastening respective ones of the front-side member 42 and the rear-side member 44 together.

By the bolts 52 being removed when the shell body 14 is replaced, the fastened state between the respective ones of the front-side members 42 and the rear-side members 44 is released, thereby enabling the insertion amount of each rear-side member 44 to be easily changed. Namely, it is possible to reduce man-hours in assembling shell bodies 14 of different sizes. Other operations are the same as in the first exemplary embodiment.

Although explanation has been given above regarding a rocker structure according to exemplary embodiments, obviously various embodiments may be implemented within a range not departing from the scope of the present disclosure. In the above-described exemplary embodiments, two states, the two states including a first state in which the insertion amount of each rear-side member 44 into a respective one of the front-side members 42 is large, and a second state in which the insertion amount is smaller than the first stage, have been described; however, the present disclosure is not limited thereto. Namely, since the first insertion holes 42H of each front-side member 42 and the second insertion holes 44H of each rear-side member 44 are formed at approximately the same pitch in the front-rear direction, the insertion amount of the rear-side members 44 can be freely adjusted using the length of adjacent insertion holes as a minimum unit.

Further, in the above-described exemplary embodiments, the same rear-side members 44 are used in the first state and in the second state; however, the present disclosure is not limited thereto. For example, in the second state, a member that is longer in the vehicle front-rear direction than the rear-side members 44 used in the first state may be used. This enables all of the first insertion holes 42H and all of the second insertion holes 44H to be in a communicating state, even in the second state, thereby enabling water to be prevented from entering into the vehicle interior through the insertion holes.

In the above-described exemplary embodiments, although the bolts 52 and the weld nuts 50 are used as fasteners, the present disclosure is not limited thereto, and other fasteners may be employed. For example, fasteners, such as rivets and clips, may be used for at least some of the fasteners.

What is claimed is:

1. A rocker structure, comprising:
   a pair of front-side members, the front-side members respectively provided at each side, in a vehicle width direction, of a vehicle lower portion at a vehicle front side, and each front-side member extending in a vehicle front-rear direction and forming a closed cross-sectional structure;

a pair of rear-side members, a front end portion of each rear-side member being inserted into a respective one of the front-side members, and each rear-side member extending in the vehicle front-rear direction and forming a closed cross-sectional structure; and fasteners that mechanically fasten together respective ones of the front-side members with respective ones of the rear-side members in at least two states, the at least two states including a first state and a second state, in the first state, an insertion amount of each rear-side member into the respective one of the front-side members is larger than an insertion amount in the second state, wherein:

each front-side member and each rear-side member includes an upper wall, a lower wall, and side walls that couple the upper wall and the lower wall together, as viewed from the vehicle front-rear direction, at least one first insertion hole for a fastener is formed at at least two wall surfaces among the upper wall, the lower wall and the side walls of the respective pair of front-side members, at least one second insertion hole for a fastener is formed at at least two wall surfaces among the upper wall, the lower wall and the side walls of the respective pair of rear-side members and at positions corresponding to each of the first insertions holes, in the first state and the second state, an axial direction of respective first insertion holes are offset from each other when viewed in a front-rear direction of a vehicle, and an axial direction of respective second insertion holes are offset from each other when viewed in a front-rear direction of a vehicle.

2. The rocker structure according to claim 1, wherein:

a plurality of first insertion holes are formed at each front-side member with a spacing between the first insertion holes in the vehicle front-rear direction; and a plurality of second insertion holes are formed at each rear-side member at positions corresponding to each of the plurality of first insertions holes, in the first state and the second state.

3. The rocker structure according to claim 1, wherein:

respective patch members are provided at a front portion of each rear-side member in the second state; and respective ones of the front-side members and the patch members are mechanically fastened together by the fasteners.

4. The rocker structure according to claim 1, wherein each fastener includes a weld nut that is fixed to an inner surface of each rear-side member, and a bolt that is screwed into the weld nut from an outer side of each front-side member.

\* \* \* \* \*